United States Patent [19]

Ishikawa

[11] Patent Number: 4,649,761

[45] Date of Patent: Mar. 17, 1987

[54] ROTARY SHAFT HOLDING MECHANISM FOR A ROTARY VARIABLE ELEMENT

[75] Inventor: Keisuke Ishikawa, Miyagi, Japan

[73] Assignee: Alps Electric Co., Ltd., Japan

[21] Appl. No.: 658,663

[22] Filed: Oct. 9, 1984

[30] Foreign Application Priority Data

Oct. 7, 1983 [JP] Japan ............................ 58-155938[U]

[51] Int. Cl.$^4$ .............................................. H01G 5/06
[52] U.S. Cl. .................................... 74/10 R; 361/298;
384/439; 403/326
[58] Field of Search ............... 74/10 R; 361/298, 299;
334/78; 403/326; 384/295, 428, 438, 439

[56]  References Cited

U.S. PATENT DOCUMENTS

| | | | |
|---|---|---|---|
| 1,906,857 | 5/1933 | Heyne et al. | 361/299 |
| 2,759,158 | 8/1956 | Puerner et al. | 361/299 X |
| 3,739,244 | 6/1973 | Tatsumi et al. | 361/298 |

FOREIGN PATENT DOCUMENTS

| | | | |
|---|---|---|---|
| 104658 | 6/1942 | Sweden | 361/298 |
| 384113 | 12/1932 | United Kingdom | 361/298 |
| 395396 | 7/1933 | United Kingdom | 361/298 |

Primary Examiner—Allan D. Herrmann
Attorney, Agent, or Firm—Guy W. Shoup

[57] ABSTRACT

A rotary shaft holding mechanism for a rotary variable element comprises a frame for rotatably supporting a rotary shaft of a rotary variable element such as a variable capacitor, a resilient member fixedly mounted to the frame for urging the rotary shaft toward the frame, and a retainer member fixedly mounted to the frame for rotatably supporting an externally adjusting end of the rotary shaft so as to rotatably hold the rotary shaft.

7 Claims, 7 Drawing Figures

ROTARY SHAFT HOLDING MECHANISM FOR A ROTARY VARIABLE ELEMENT

BACKGROUND OF THE INVENTION

The present invention relates to a rotary shaft holding mechanism for a rotary variable element, and more particularly to a rotary shaft holding mechanism for effectively holding a rotary shaft of such devices as a variable capacitor element used in electronic devices such as various kinds of tuners and RF modulators, etc.

In order to reduce the size of electronic components such as tuners, it is necessary to reduce the size of the component parts. Efforts have been made to reduce the size of the support assemblies for movable portions of variable capacitors for tuners or the like, and a typical example of a conventional rotary shaft holding mechanism for a rotary variable element will be explained by referring to FIGS. 1 to 3. FIG. 1 is a cross section of the conventional rotary shaft holding mechanism for a rotary variable capacitor wherein a local oscillator 1 of RF modulator including a variable capacitor is received in a casing 2. FIG. 2 is a perspective view of the rotary shaft holding mechanism shown in FIG. 1.

In this example, a frame 3 of the local oscillator 1 receives fixed capacitors 4A, 4B, a variable capacitor 5, and a stripline 6 for defining an oscillation frequency. The oscillation frequency of the local oscillator 1 may be varied by adjusting the value of capacitance of the variable capacitor 5. The variable capacitor 5 is composed of a rotor section 5A rotatably supported by a rotary shaft 5C, and a stator section 5B. The rotary shaft 5C is rotatably supported by the frame with opposite end portions of the rotary shaft 5C being urged into corner portions 3C and 3D of large holes 3A and 3B formed in the side walls of the frame by elongate bias springs 7 and 8 fixedly disposed at respective corner portions 3C and 3D. Thus, the rotary shaft 5C is rotatably mounted to the frame 3 by a biasing force applied by the bias springs 7 and 8. A stopping plate 9 of an arc-like configuration is mounted to one end of the rotary shaft 5C so as to rotate therewith and define with a stopper plate 10 fixed to the flame 3 a mechanism for limiting the angle of rotation of the shaft 5C.

The capacitance value varied by inserting the tip of a screw driver into the slot formed at one end of the shaft 5C. Inadvertently, however, the tip of the screw driver may tilt the shaft 5C as shown in FIG. 3, and the rotor section 5A and the stator section 5B are likely to become shorted. Thus, in some electronic devices such as RF modulators, a power circuit thereof may be undesirably damaged by the short-circuit between the rotary and stator section.

SUMMARY OF THE INVENTION

An object of the present invention is to eliminate the above-described drawback of the conventional rotary shaft holding mechanism.

Another object of the present invention is to provide a rotary shaft holding mechanism for a rotary variable element which is able to completely prevent the short-circuit of the rotary variable element upon adjustment of a value of the rotary variable element even when the rotary variable element is mounted to a small frame.

To this end, the rotary shaft holding mechanism of the present invention comprises a frame for rotatably supporting a rotary shaft of a rotary variable element such as a variable capacitor, a resilient member fixedly mounted to the frame for urging the rotary shaft toward the frame, and a retainer member fixedly mounted to the frame for rotatably supporting an externally adjusting end of the rotary shaft so as to rotatably hold the rotary shaft.

DESCRIPTION OF PREFERRED EMBODIMENT

A rotary shaft holding mechanism for a rotary variable element according to the present invention will be explained referring to FIGS. 4 to 7.

Figure 1:
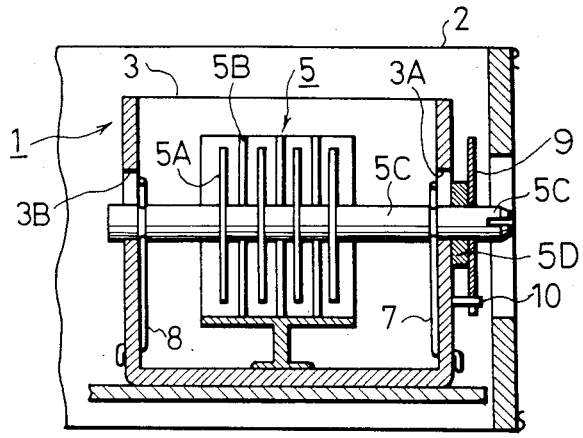
FIG. 1 is a cross section of a typical example of conventional rotary shaft holding mechanism for a rotary variable element.
Figure 2:
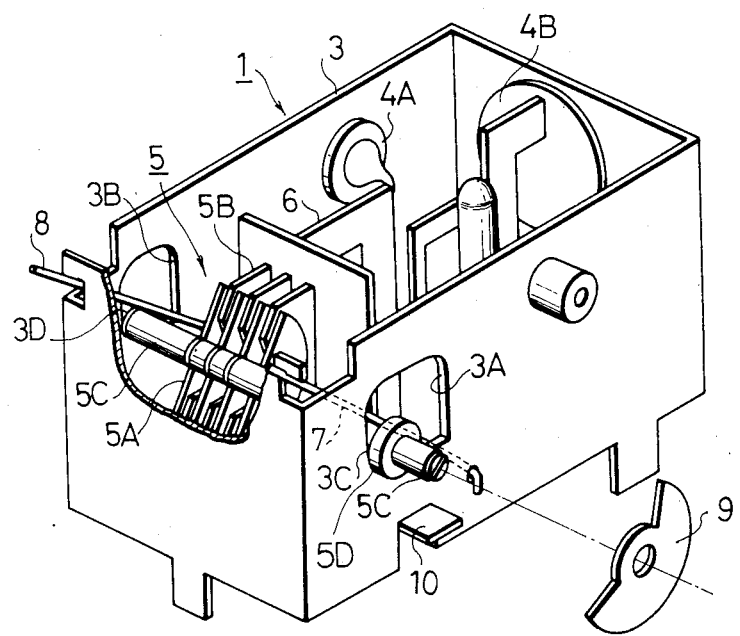
FIG. 2 is a perspective view of the conventional rotary shaft holding mechanism shown in FIG. 1.
Figure 3:
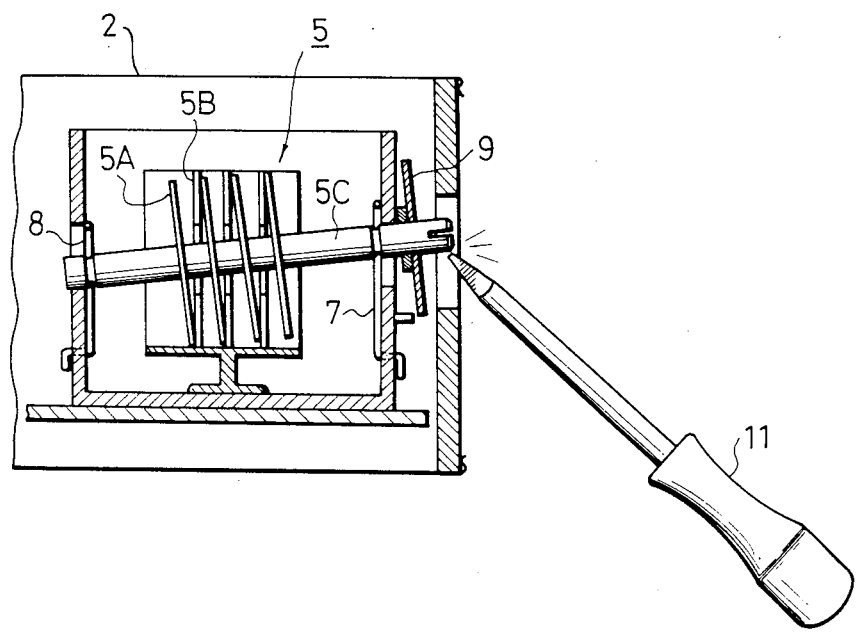
FIG. 3 is a cross section of the conventional rotary shaft holding mechanism for explaining the operation for adjusting a value of the rotary variable element.
Figure 4:
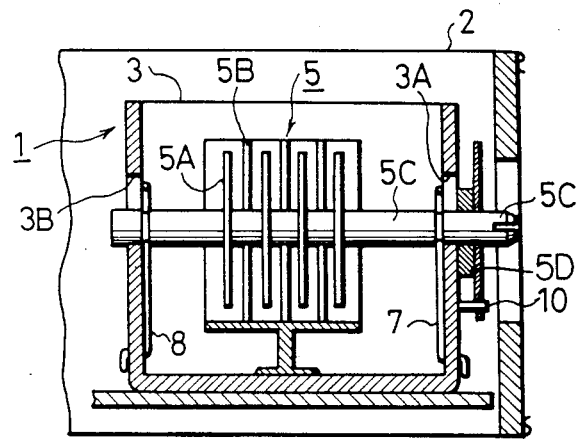
FIG. 4 is a cross section of a first embodiment of a rotary shaft holding mechanism according to the present invention.
Figure 5:
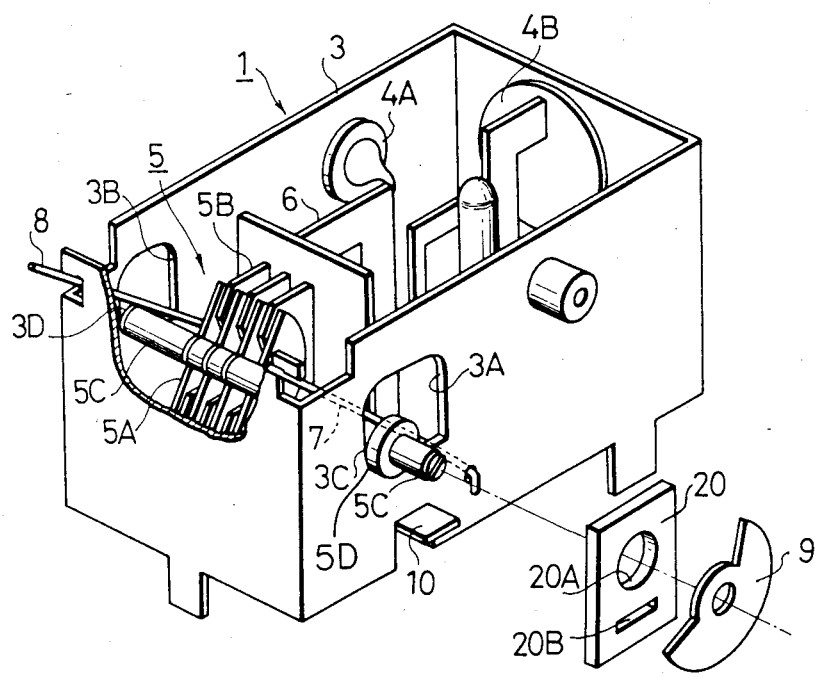
FIG. 5 is a perspective view of the rotary shaft holding mechanism shown in FIG. 4.

FIGS. 4 and 5 illustrate a first embodiment of the present invention wherein a RF modulator has a casing 2 including a local oscillator 1. The local oscillator 1 is similar to that of FIGS. 1–3 and similar components are designated by similar reference numerals.

At the side wall of the frame 3 adjacent the slot formed in the end of the rotary shaft 5C, a retainer plate 20 for rotatably holding the rotary shaft 5C is mounted. The retainer plate 20 has a hole 20A for receiving therethrough the end of the rotary shaft 5C having the adjusting slot, and a hole 20B of a rectangular configuration for receiving a stopping plate 10 therethrough to prevent rotation of the plate 20. The retainer plate 20 is held securely in place by the stopping plate 9 fixed to the shaft 5C.

According to the first embodiment, even if the rotary shaft 5C is pushed in any direction by an external force caused by a screw driver, etc., the rotary shaft 5C is completely prevented from moving away from the corner portion 3C because the rotary shaft 5C is held in the hole 20A of the retainer plate 20 fixed to the frame 3. Thus, the short-circuit between the stator and rotor sections thereof which has been likely in the conventional device can be prevented completely.

Figure 6:
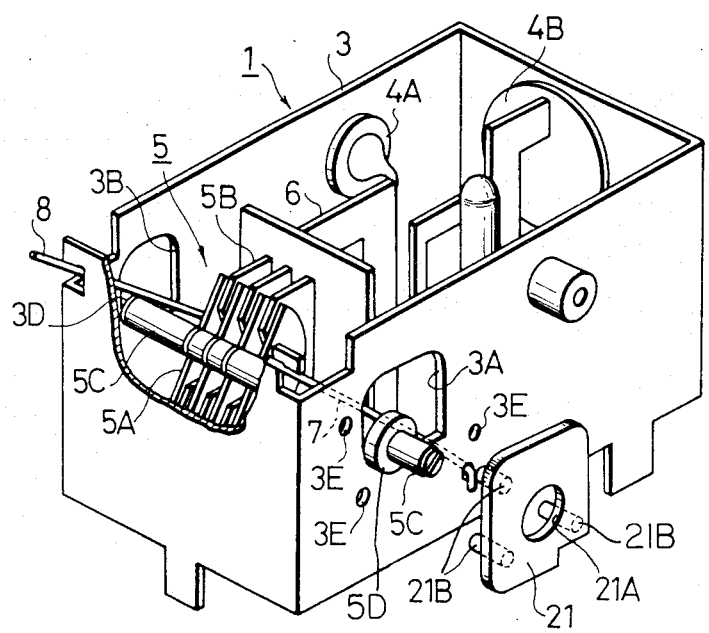
FIG. 6 is a perspective view of a second embodiment according to the present invention.

A second embodiment of the present invention will be explained referring to FIG. 6. The second embodiment relates to a modification of the first embodiment, wherein a retainer plate 21 for fixedly holding the end of the rotary shaft 5C containing the adjusting slot is fixedly mounted to the frame 3 and which does not have a stopping plate 10.

In this embodiment, the retainer plate 21 having a hole 21A for receiving the end of the rotary shaft 5C is provided with three stopping projections 21B, and the frame 3 is provided with three stopping holes 3E in correspondence with the stopping projections. Thus, the retainer plate 21 is fixedly mounted to the frame 3 by inserting the projections 21B into holes 3E, thereby fixedly holding the rotary shaft 5C in the hole 21A. The remaining elements in the second embodiment are constructed in the same manner as the first embodiment. In this embodiment, the short-circuit of the variable capacitor can be prevented in the same manner as the first embodiment.

Figure 7:
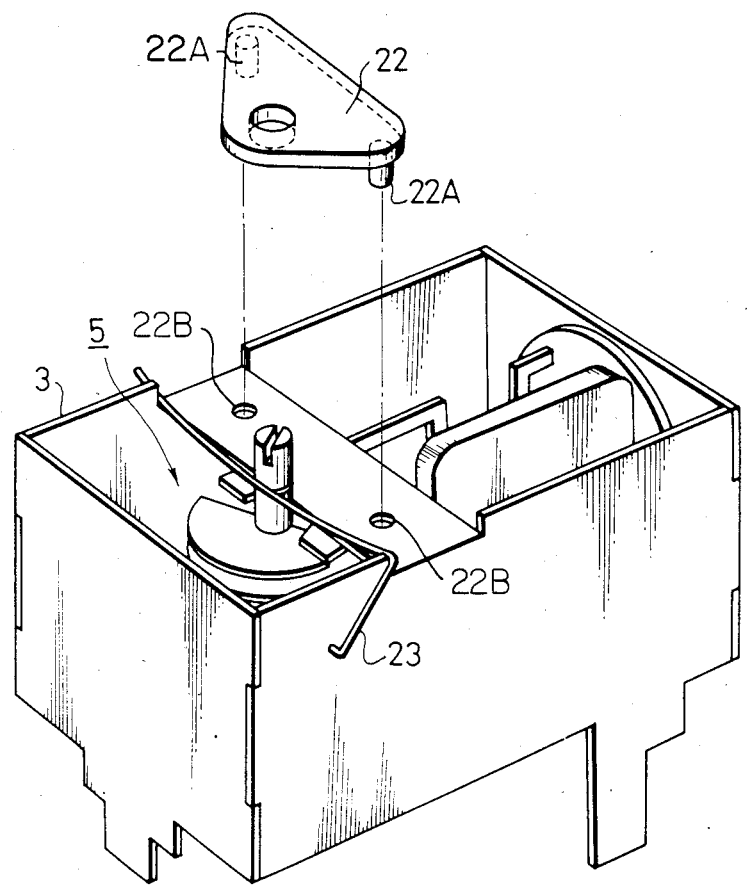
FIG. 7 is a perspective view of a modified example of the second embodiment shown in FIG. 6.

FIG. 7 shows a modified example of the second embodiment wherein the variable capacitor 5 can be adjusted from the top side of the frame.

To this end, a retainer plate 22 having a hole for receiving the end of the rotary shaft having the adjuster slot is formed in a triangular-like configuration and is provided wih two stopping projections 22A as shown in FIG. 7. A mounting plate for fixedly mounting the retainer plate 22 thereon is provided at the top end of the frame 3 in a manner that the opposite end portions thereof are fixedly connected to the top end portions of the opposite side walls of the frame 3. The mounting plate is provided with two holes for receiving the associated projections 22A therethrough, thereby fixedly mounting the retainer plate 22 to the top end of the frame. The end portion of the rotary shaft having the adjusting slot is urged towards the mounting plate by a biasing force of a bias spring 23 fixedly engaged with the frame, thereby rotatably holding the rotary shaft. Now, the other end of the rotary shaft is also rotatably supported by another bias spring at the bottom end of the frame.

In this example, the short-circuit of the variable capacitor can also be prevented in the same manner as the second embodiment.

Thus, according to the present invention, there is provided a retainer plate for rotatably holding an externally adjusting end of a rotary variable element and the retainer plate is fixed to the frame receiving the rotary variable element. Thus, there can be provided an effective rotary shaft holding mechanism for a rotary variable element which is able to eliminate the above-described drawbacks of the conventional holding mechanism completely, whereby the external adjustment of the rotary variable element can be accomplished safely.

I claim:

1. A rotary shaft holding mechanism for a rotary variable element comprising:
    a frame for housing a rotary variable element having a rotary shaft with an adjusting end thereof adapted to be adjusted externally of said frame, said frame including a side wall having a hole several times larger than a diameter of said rotary shaft through which said adjusting end extends;
    a resilient member fixedly mounted to said frame for holding said adjusting end toward one position in said hole of said side wall of said frame; and
    a retainer member in the form of a plate fixedly mounted to an external surface of said side wall of said frame so as to cover at least a part of said hole of said frame, said plate having a hole slightly larger than the diameter of said shaft through which said adjusting end extends for rotatably supporting said rotary shaft.

2. A rotary shaft holding mechanism for a rotary variable element according to claim 1, wherein opposite side walls of said frame have first holes for receiving the end portions of said rotary shaft therethrough, and said resilient member urges each of the end portions of said rotary shaft to a corner portion of associated one of said first holes.

3. A rotary shaft holding mechanism for a rotary variable element according to claim 2, wherein said retainer member has a second hole for receiving the externally adjusting end of said rotary shaft.

4. A rotary shaft holding mechanism for a rotary variable element according to claim 3, wherein said retainer member has a third hole for receiving a stopping plate fixed to the side wall of said frame so as to fixedly mount said retainer member to said frame.

5. A rotary shaft holding mechanism for a rotary variable element according to claim 4, which further includes a rotation stopping plate mounted at said externally adjusting end for rotating together with the rotation of said rotary shaft, and said rotation stopping plate is limited in its rotation range by the engagement with said stopping plate and urges said retainer member towards said side wall of said frame.

6. A rotary shaft holding mechanism for a rotary variable element according to claim 3, wherein said retainer member has a plurality of projections, and said side wall of said frame having said first holes further has a plurality of holes for receiving said projections of said retainer member so as to fixedly mount said retainer member to said frame.

7. A rotary shaft holding mechanism for a rotary variable element comprising:
    a frame for housing a rotary variable element having a rotary shaft with an adjusting end thereof adapted to be adjusted externally of said frame, said frame including two mounting plates at top and bottom ends thereof which are fixedly mounted to said frame, said mounting plate at the top end having a plurality of mounting holes, and said rotary variable element and rotary shaft being oriented such that said adjusting end extends from said top end of said frame;
    resilient members fixedly mounted to said frame for urging end portions of said rotary shaft toward said mounting plates at the top and bottom ends of said frame; and
    a retainer member having a hole for receiving said adjusting end of said rotary shaft therethrough and a plurality of projections to be received in said plurality of mounting holes, respectively, thereby fixedly mounting said retainer member to said mounting plate at the top end of said frame.

* * * * *